United States Patent
Baier et al.

(10) Patent No.: US 7,496,147 B2
(45) Date of Patent: Feb. 24, 2009

(54) METHOD FOR TRANSMITTING INFORMATION IN A MIMO RADIO COMMUNICATION SYSTEM AND RADIO COMMUNICATION SYSTEM

(75) Inventors: Paul-Walter Baier, Kaiserslautern (DE); Christoph Arnold Jötten, Wadern (DE); Michael Meurer, Kaiserslautern (DE); Wei Qiu, Kaiserslautern (DE); Hendrik Tröger, Kaiserslautern (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 373 days.

(21) Appl. No.: 10/516,207

(22) PCT Filed: May 27, 2003

(86) PCT No.: PCT/DE03/01723

§ 371 (c)(1), (2), (4) Date: Mar. 31, 2005

(87) PCT Pub. No.: WO03/101009

PCT Pub. Date: Dec. 4, 2003

(65) Prior Publication Data

US 2005/0169396 A1  Aug. 4, 2005

(30) Foreign Application Priority Data

May 27, 2002 (DE) ............................... 102 23 564

(51) Int. Cl.
*H04B 7/02* (2006.01)
*H04L 1/02* (2006.01)

(52) U.S. Cl. .................. 375/267; 375/220; 375/296; 375/349; 455/101

(58) Field of Classification Search .............. 375/267, 375/299, 346–347, 349, 219–220, 259–260, 375/295–296; 455/101, 130, 132
See application file for complete search history.

(56) References Cited

U.S. PATENT DOCUMENTS 6,144,711 A * 11/2000 Raleigh et al. .............. 375/347

(Continued)

FOREIGN PATENT DOCUMENTS

DE  198 50 279  5/2000

(Continued)

OTHER PUBLICATIONS

Baier et al, "Joint transmission (JT), an alternative rationale for the downlink of Time Division CDMA using multi-element transmit antennas," pp. 1-5.*

(Continued)

*Primary Examiner*—Shuwang Liu
*Assistant Examiner*—James M Perez
(74) *Attorney, Agent, or Firm*—Bell Boyd & Lloyd LLC

(57) ABSTRACT

A method is provided for transmitting information in a radio communication system provided with at least one transmitting station (AP) and at least two receiver stations (MT). The transmitting station (AP) and the receiver stations (MT) are connected together via a radio communication interface. The transmitting stations (AP) includes a transmitting antenna with $K_B > 1$ antenna elements, whereby $K_B \geq 1$, and the receiving stations (MT) respectively include a transmitting antenna with $K_M$ antenna elements, whereby $K_M \geq 1$, and which communicate via a MIMO-transmission. The transmitting signals transmitted from the antenna elements of the transmitting antenna of the transmitting station (AP) are produced in a common process and are adapted in relation to the transmitting energy to be used during radiation. Receiving signals received by the antenna elements of the receiver antenna of the receiver stations (MT) are detected in a linear signal process.

2 Claims, 3 Drawing Sheets

U.S. PATENT DOCUMENTS 6,718,184 B1 * 4/2004 Aiken et al. ............. 455/562.1
7,248,638 B1 * 7/2007 Banister .................... 375/267

FOREIGN PATENT DOCUMENTS

EP 0 801 473 10/1997

OTHER PUBLICATIONS

Meuer et al, "Joint transmission; advantageous downlink concept for CDMA mobile radio systems using time division duplexing", pp. 900-901, May 2000.

Meuer et al, "Synthesis of joint detection and joint transmission in CDMA downlinks", Electronics Letters, Jul. 5, 2001, vol. 37, No. 14.

Troger et al., "Performance Assessment of Joint Transmission (JT) Multi-User Downlinks and Multi-Element Transmit Antennas", Smart Antennas, vol. 12, No. 5, Sep.-Oct. 2001, pp. 407-416.

XP-002257233, Baier et al., "Joint Transmission (JT), an alternative rationale for the downlink of Time Division CDMA using multi-element transmit antennas", pp. 1-5, Sep. 2000.

* cited by examiner

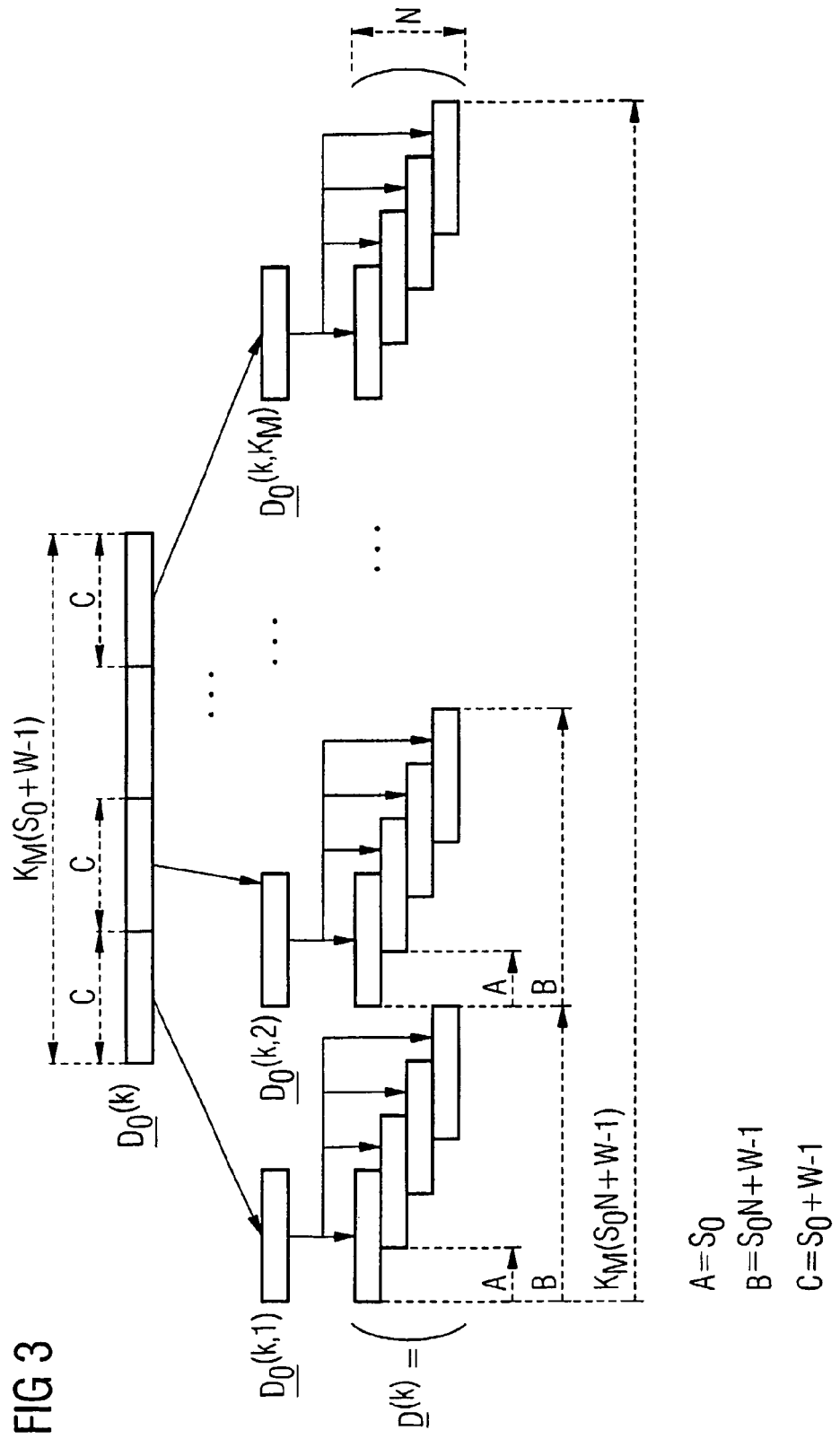

METHOD FOR TRANSMITTING INFORMATION IN A MIMO RADIO COMMUNICATION SYSTEM AND RADIO COMMUNICATION SYSTEM

BACKGROUND OF THE INVENTION

In a radio communication systems, information (for example speech, image information, video information, SMS (Short Message Service) or other data) is transmitted using electromagnetic waves over a radio interface between transmitting and receiver stations (base station or subscriber station). In such cases, the electromagnetic waves are propagated using carrier frequencies lying within the frequency band provided for the relevant system. For the GSM (Global System for Mobile Communication) mobile radio system which has been introduced, frequencies at 900, 1800 und 1900 MHz were used. For future mobile radio systems with CDMA or TD/CDMA procedures, such as UMTS (Universal Mobile Telecommunication System) or other third-generation systems, there is provision for frequencies in the frequency band of around 2000 MHz.

The access from stations to the shared transmission medium is regulated in these radio communication systems by Multiple Access (MA). With these multiple accesses, the transmission medium can be subdivided between the stations in the time area (Time Division Multiple Access, TDMA), in the frequency area (Frequency Division Multiple Access, FDMA), in the code area (Code Division Multiple Access, CDMA) or in the space area (Space Division Multiple Access, SDMA). In this case, the transmission medium (with GSM (Global System for Mobile Communications), TETRA (Terrestrial Trunked Radio), DECT (Digital Enhanced Cordless Telecommunication), UMTS (Universal Mobile Telecommunication System) for example) is frequently subdivided in the frequency and/or time channels in accordance with the radio interface. These channels are generally referred to as transmission channels or radio channels. For systems where coordination is decentralized, measurements are used to decide on the usability of these transmission channels. In accordance with the radio radiation (i.e., depending on the radio field attenuation), re-use of these transmission channels at an appropriate spacing is possible.

For radio transmission between a transmit station and at least one receiver station of a radio transmission system, interference occurrences now arise as a result of the frequency selectivity of the transmission channels, such interference being known as intersymbol interference and Multiple Access interference. The greater the transmission bandwidth of the transmission channel, the more these interferences distort the transmit signals.

Conventionally, the transmit signals are generated at the transmit station without taking account of the effective radio channels. The interference occurrences then arising are rectified in a second step, at least approximately by the appropriate matched and generally very expensive methods for detecting the transmitted data at the receiver stations.

Radio communication systems with at least one transmit station (Transmit station AP or base station) and at least two receiver stations (Receiver station MT) are known, with the transmit station (AP) and the receiver stations (MT) being connected to one another over a radio communications interface. Here, the transmit station features a transmit antenna with $K_B$ antenna elements (with $K_B \geq 1$) and the receiver stations each feature a transmit antenna with $K_M$ antenna elements (with $K_M \geq 1$). They communicate by MIMO (Multiple Input-Multiple Output) transmission.

Radio transmission devices with at least one transmit station having a number of transmit elements and with at least one receiver station having a number of receive elements are referred to in this document as MIMO systems. Radio transmission between at least one transmit station and at least one receiver station of a MIMO system is subject, as a result of the frequency selectivity of the transmission channels, to interference occurrences which are known as intersymbol interferences and Multiple Access interference. For the purposes of radio transmission from at least one transmit station to the receiver stations in a MIMO there are basically two requirements which need to be fulfilled:

suitable transmit signals are to be generated and propagated by the relevant transmit station for each of the transmit antennas; and the data which is of interest in each case is to be detected by each of the receiver stations by suitable processing of the receive signals of all receive antennas.

In recent years, alternative concepts, such as Joint Transmission or Joint Predistortion have been investigated, which, by taking account of the effective transmission channels, eliminate the interference occurrences completely, to a large extent or at least partly at the point at which the transmit signals are being generated at the transmit station. See, for example:

M. Meurer, P. W. Baier, T. Weber, Y. Lu, A. Papathanassiou, "Joint Transmission, an advantageous downlink concept for CDMA mobile radio system using time division duplexing", IEE Electronics Letters, Bd. 36, 2000, S. 900-901 [1] and P. W. Baier, M. Meurer, T. Weber, H. Tröger, "Joint Transmission (JT), an alternative rationale for the downlink of time division CDMA using multi-element transmit antennas", Proc. IEEE 7th International Symposium on Spread Spectrum Techniques & Applications (ISSSTA'2000), Parsippany/N.J., 2000, S. 1-5 [2].

The cited documents present a Joint Transmission (JT) transmission method, especially for downlink mobile radio systems from the base station to the subscriber stations, which allows simultaneous provision to a number of subscribers. The transmit signals propagated by the transmit antennas of the base station or transmit station (AP) are generated in a common process in this case and optimized with respect to the transmit energy to be used.

In Joint Transmission systems with at least one transmit station having at least one transmit antenna and with at least one receiver station having at least one receive antenna, the linear receive-side signal processing, referred to below as demodulation, is described by receiver station-specific demodulator matrices [2].

In conventional Joint-Transmission systems [2], the subscriber-specific demodulation matrices are defined by fixed signatures; e.g., CDMA codes. This process is particularly determined due to the fact that no information about the space and time transmission characteristics of the mobile radio channels operating between transmit stations and receiver stations is included in the design of the subscriber-specific demodulation matrices.

Similar to the process used in the Joint Transmission (JT) method, such transmit signals also may be generated when receiver stations with a number of receive antennas are employed, by using information about the effective radio channels and information about the receive-side-specific processing methods defined a priori for detection, which, theoretically, perfectly eliminates the interference occurrences discussed at the point of transmission.

The present invention is, thus, directed toward a method and an improved transmit device which, for the effective transmission channels, takes account both of a minimization of the transmit power and also of further quality criteria, such as a directional characteristic of the transmit signal for example.

SUMMARY OF THE INVENTION

In accordance with present invention, transmit signals propagated from the antenna elements of the transmit station are generated in a common process and matched with regard to the transmit energy to be used for radiation, with the receive signal received by the antenna elements of the receive antennas of the receiver station being detected in a linear signal process.

Advantageously, the individual signals for the antenna elements of the transmit antenna of the transmit station can be calculated before radiation with the aid of a modulator matrix $\underline{M}$.

In this case, a transmit signal vector $\underline{\bar{t}} = \underline{\bar{M}} \cdot \underline{\bar{d}}$ can, in particular, be generated by essentially linear modulation of at least one data vector $\underline{\bar{d}}$ to be transmitted with the modulator matrix $\underline{\bar{M}}$.

In a further embodiment of the present invention, demodulation is undertaken with linear receiver-side signal processing, taking account of the space and time transmission characteristics between transmit stations and receiver stations.

In particular, receive-station-specific demodulator matrices $\underline{D}$ can be employed for the linear receive-side signal processing.

Advantageously, each transmit station (AP) and each receiver station (MT) is connected via at least one radio channel characterized by a channel matrix $\underline{H}$.

The system matrix $\underline{B} = \underline{D} \cdot \underline{H}$ contained in the modulator matrix $\underline{M}$ is preferably given by the product of the demodulator matrix $\underline{D}$ and channel matrix $\underline{H}$.

With the inventive radio communication system in which the transmit station features a transmit antenna with KB antenna elements (with $KB \geq 1$) and the receiver stations each feature one transmit antenna with KM antenna elements (with $KM \geq 1$), parts are provided for generating the transmit signals propagated from the antenna elements of the transmit antenna of the transmit station (AP) in a shared process and for matching with regard to the transmit energy to be used for radiation, as well as parts for detecting the receive signals received from the antenna elements of the receive antennas of the receiver stations in a linear signal process.

The radio communication system in accordance with the present invention is particularly suitable for executing a method in accordance with the present invention.

In a Multi-User MIMO transmission system, the present invention combines, on the one hand:

the generation of access-point-specific transmit signals in accordance with Joint Transmission, and one the other hand:

the demodulation, taking into consideration information about the space and time division transmission devices, of the effective mobile radio channels between the transmit stations and the receiver stations.

Technical implementations of this innovative combined method allow the benefits of both methods to be profitably employed.

Information about the space and time transmission characteristics of the effective mobile radio channels between transmit stations and receiver stations can be taken into account when determining the access-point-specific demodulation.

Some of the benefits offered by the inclusion of channel characteristics are as follows:

Reduction of the total transmit energy,

Avoiding combinations of mobile radio channels and incorrectly matched demodulation matrices, Improvement of the intercell interference situation in cellular Joint-Transmission systems, Reduction of the SNR degradation (see [3]), Increase in transmission efficiency (see [3]), Increase in system capacity.

More details can be found, for example, in

H. Tröger, T. Weber, M. Meurer, P. W. Baier, "Performance Assessment of Joint Transmission (JT) Multi User Downlink with Multi-Element Transmit Antennas", European Transmission on Telecommunications, ETT Vol. 12, No. 5, September/October 2001 [3], Additional features and advantages of the present invention are described in, and will be apparent from, the following Detailed Description of the Invention and the Figures.

BRIEF DESCRIPTION OF THE FIGURES

FIG. 3 shows the structure of a channel matrix $\underline{D}^{(k)}$ in accordance with equation (38) below.

DETAILED DESCRIPTION OF THE INVENTION

Figure 1:
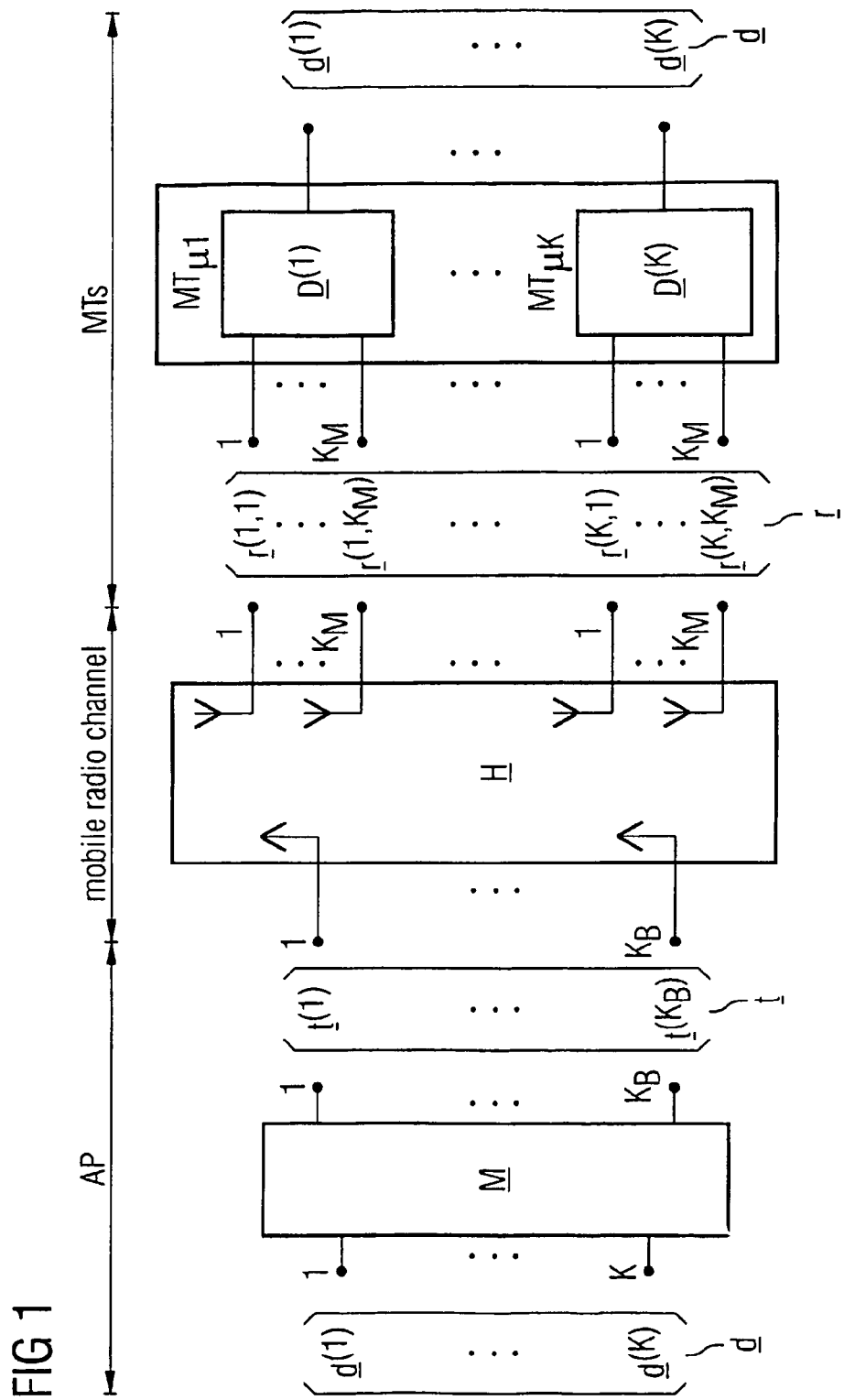
FIG. 1 shows a system model of an MIMO JT system in accordance with the invention.

Joint Transmission (JT) is a highly promising transmission method for the downlink [1, 2, 3] which is proposed for mobile radio systems using the hybrid multiple access method TDMA/CDMA. With JT, the transmission signals are advantageously generated jointly for all receiver stations MT. JT is based on prespecified demodulators, wherein on the basis of the characteristics of these demodulators and the channel pulse responses, the modulator in the transmit station AP is defined a posteriori so that intersymbol interference (ISI) and Multiple Access Interference (MAI) are completely eliminated. To date, investigations into JT have only taken account of multi-element antennas at the transmit station AP. Statistical investigations [3] have revealed the benefit of transmit antenna groups. The present invention relates to JT for transmission systems with a number of subscribers, where multi-element antennas are used both at the transmit station AP and at the receiver stations MT. A system model of such a MIMO JT method is presented below.

Signal Transmission Model of MIMO Systems with a Number of Subscribers

At the AP, a group of $K_B$ transmit antenna elements is used and at each MT $\mu_k$ $k=1 \ldots K$) a group of $K_M$ receive antenna elements is set up. The channel impulse responses $$\underline{h}^{(k,k_B,k_M)} = \left( \underline{h}_1^{(k,k_B,k_M)} \ldots \underline{h}_W^{(k,k_B,k_M)} \right)^T, \quad (1)$$

$$k = 1 \ldots K, k_B = 1 \ldots K_B, k_M = 1 \ldots K_M,$$

of the dimension W characterize the mobile radio channel between the transmit antenna element $k_B$ and the receive antenna element $k_m$ of MT $\mu_k$. The transmit antenna-specific transmit signal of dimension S $$\underline{t}^{(k_B)} = \left(\underline{t}_1^{(k_B)} \ldots \underline{t}_S^{(k_B)}\right)^T, k_B = 1 \ldots K_B, \quad (2)$$

is injected into each of the $k_B$ transmit antenna elements. The $K_B$ antenna-specific transmit signals $\underline{t}^{(k_B)}$ from (2) can be combined to form the overall transmit signal $$\underline{t} = \left(\underline{t}^{(1)T} \ldots \underline{t}^{(K_B)T}\right)^T \quad (3)$$

of the dimension $K_B S$. With the channel impulse responses $\underline{h}^{(k,k_B,k_M)}$ from (1) the MT and antenna-specific channel folding matrices $$\underline{H}^{(k,k_B,k_M)} = (\underline{H}_{i,j}^{(k,k_B,k_M)}), i = 1 \ldots S+W-1, j = 1 \ldots S, \quad (4)$$

$$\underline{H}_{i,j}^{(k,k_B,k_M)} = \begin{cases} \underline{h}_{i-j+1}^{(k,k_B,k_M)} & 1 \leq i-j+1 \leq W, \\ 0 & sonst, \end{cases}$$

$$k = 1 \ldots K, k_B = 1 \ldots K_B, k_M = 1 \ldots K_M,$$

can be formed. $\underline{h}^{(k,k_B,k_M)}$ of (4) has the dimension $(S+W-1) \times S$.

With $\underline{t}^{(k_B)}$ of (2) and $\underline{h}^{(k,k_B,k_M)}$ of (4) the signal received at the receive antenna $k_M$ from MT $\mu_k$ can be expressed as vector $$\underline{r}^{(k,k_M)} = \sum_{k_B=1}^{K_B} \underline{H}^{(k,k_B,k_M)} \underline{t}^{(k_B)} \quad (5)$$

$$= \underbrace{(\underline{H}^{(k,1,k_M)} \ldots \underline{H}^{(k,K_B,k_M)})}_{\underline{H}^{(k,k_M)}} \underline{t}$$

$$= \underline{H}^{(k,k_M)} \underline{t}, k = 1 \ldots K, k_M = 1 \ldots K_M.$$

$\underline{r}^{(k,k_M)}$ and $\underline{H}^{(k,k_M)}$ have the dimensions $(S+W-1) \times 1$ or $(S+W-1) \times (K_B S)$. The MT and receive-antenna-specific channel folding matrix is designated as $\underline{H}^{(k,k_M)}$.

The $K_M$ signals $\underline{r}^{(k,k_M)}$ received at MT $\mu_k$ k=1 . . . K) of (5) can be arranged in a vector $$\underline{r}^{(k)} = \left(\underline{r}^{(k,1)T} \ldots \underline{r}^{(k,K_M)T}\right)^T, k = 1 \ldots K, \quad (6)$$

of dimension $K_M(S+W-1)$ which is designated as the MT-specific receive signal at MT $\mu_k$.

With the $[K_M(S+W-1)] \times (K_B S)$ MT-specific channel folding matrices $$\underline{H}^{(k)} = \left(\underline{H}^{(k,1)T} \ldots \underline{H}^{(k,K_M)T}\right)^T, k = 1 \ldots K, \quad (7)$$

the MT-specific receive signal $\underline{r}^{(k)}$ of (6) becomes $$\underline{r}^{(k)} = \underline{H}^{(k)} \underline{t}. \quad (8)$$

The K MT-specific receive signals $\underline{r}^{(k)}$ of (6) are combined to form the overall receive signal $$\underline{r} = \left(\underline{r}^{(1)T} \ldots \underline{r}^{(K)T}\right)^T \quad (9)$$

$$= \underbrace{\left(\underline{H}^{(1)T} \ldots \underline{H}^{(K)T}\right)^T}_{\underline{H}} \underline{t}$$

$$= \underline{H} \underline{t}$$

$\underline{r}$ and $\underline{H}$ from (9) have the dimensions $KK_M(S+W-1)$ or $[KK_M(S+W-1)] \times (K_B S)$ respectively.

Data Transmission and Recognition

It is assumed that in a TDMA burst, N data symbols are to be transmitted from the AP to the MT $\mu_k$ k=1 . . . K). The $\underline{d}_n^{(k)}$, k=1 . . . N intended for MT $\mu_k$, k=1 . . . K are assigned in the data vector $$\underline{d}^{(k)} = (\underline{d}_1^{(k)} \ldots \underline{d}_N^{(k)})^T \quad (10)$$

the dimension N. The K data vectors $\underline{d}^{(k)}$ (k=1 . . . K) are combined to form the overall data vector $$\underline{d} = \left(\underline{d}^{(1)T} \ldots \underline{d}^{(K)T}\right)^T = (d_1 \ldots d_{KN})^T \quad (11)$$

of dimension KN. To transmit data from the AP to the MT, the overall transmit signal $\underline{t}$ of (3) must be expressed by the overall data vector $\underline{d}$ of (11). If linear modulation is assumed, the modulation process can be expressed as $$\underline{t} = \underline{M} \underline{d}. \quad (12)$$

The matrix $\underline{M}$ is called the modulator matrix and has the dimension $(K_B S) \times (KN)$.

According to the observations made in [3], for each K MT $\mu_k$ k=1 . . . K) a demodulator matrix $\underline{D}^{(k)}$ of dimension $N \times [K_M(S+W-1)]$ must be defined in advance and the overall demodulator matrix of the dimension $(KN) \times [KK_M(S+W-1)]$ is then specified as $$\underline{D} = \text{diagonal block matrix} \left(\underline{D}^{(1)} \ldots \underline{D}^{(k)}\right) \quad (13)$$

FIG. 1 shows the system model of the MIMO-JT method. In the case of the JT, the modulator matrix M of (12) is determined taking into account the demodulator matrix $\underline{D}$ of (13) and the channel folding matrix $\underline{H}$ of (9) a posteriori, such that $$\underline{d} \stackrel{!}{=} \underline{D}\underline{r} = \underline{D}\underline{H}\underline{t} = \underline{D}\underline{H}\underline{M}\underline{d} \quad (14)$$

applies. According to the representation in [1, 2, 3] one selection option is $$\underline{M} = (\underline{D}\,\underline{H})^{*T}(\underline{D}\,\underline{H}(\underline{D}\,\underline{H})^{*T})^{-1}. \tag{15}$$

In this case, for a given $\underline{H}$ and $\underline{D}$ the overall transmit energy $\|\underline{t}\|^2/2$ is minimized. A major problem in designing this type of MIMO-JT method is that of defining the demodulator matrix $\underline{D}$ in order to obtain an advantageous system performance.

To aid clarity, a MIMO system with only one subscriber is considered below.

In the investigations of JT systems conducted thus far, multiple antennas have only been taken into account at the transmit station (AP) and not at the receiver stations (MT), wherein MIMO antenna arrangements are not included in the considerations. The important point when including these types of antenna arrangements in JT systems is the definition of a suitable demodulator matrix.

Elementary JT System with One MIMO Antenna Arrangement

In this section, an elementary JT system is considered, in which the AP communicates with just one MT $\mu_k$, $k \in (1 \ldots K)$ from a collective of K MT $\mu_k$ ($k=1 \ldots K$) and in which an individual data symbol is transmitted to this MT. This situation with just one MT and just one data symbol is indicated below by the index "0".

The MIMO antenna arrangement considered consists of $K_B$ transmit antennas at the AP and $K_M$ receive antennas at each MT $\mu_k$ ($k=1 \ldots K$). The names and dimensions of the vectors and matrices introduced in the course of this section are summarized in Tables 1 and 2.

In each of the $K_B$ transmit antennas the transmit antenna-specific transmit signal $$\underline{t}_0^{(k,k_B)} = \left(t_{0,1}^{(k,k_B)} \ldots t_{0,S_0}^{(k,k_B)}\right)^T, k_B = 1 \ldots K_B, \tag{16}$$

of dimension $S_0$ is injected. If $S_0$ is greater than 1, the transmitted data symbol is spread spectrally. $S_0$ is thus called the spread factor. The $K_B$ antenna-specific transmit signals $\underline{t}_0^{(k,k_B)}$ of (16) are combined into the overall transmit signal $$\underline{t}_0^{(k)} = \left(\underline{t}_0^{(k,1)T} \ldots \underline{t}_0^{(k,K_B)T}\right)^T \tag{17}$$

of dimension $K_B S_0$.

The radio channel between the transmit antenna $k_B$ and the receive antenna $k_M$ of the MT $\mu_k$ is characterized by the channel response word $$\underline{h}^{(k,k_B,k_M)} = \left(h_1^{(k,k_B,k_M)} \ldots h_W^{(k,k_B,k_M)}\right)^T \tag{18}$$

of the dimension W. With $\underline{h}^{(k,k_B,k_M)}$ from (18) the MT- and antenna-specific channel matrix $$\underline{H}_0^{(k,k_B,k_M)} = (\underline{H}_{0\,i,j}^{(k,k_B,k_M)}), i = 1 \ldots S_0 + W - 1, j = 1 \ldots S_0, \tag{19}$$

$$\underline{H}_{0\,i,j}^{(k,k_B,k_M)} = \begin{cases} h_{i-j+1}^{(k,k_B,k_M)} & 1 \le i - j + 1 \le W, \\ 0 & \text{sonst}, \end{cases}$$

$$k_M = 1 \ldots K_M, k = 1 \ldots K, k_B = 1 \ldots K_B,$$

can be formed. $H_0^{(k,k_B,k_M)}$ has the dimension $(S_0+W-1) \times S_0$.

With $\underline{t}_0^{(k)}$ of (17) and $H_0^{(k,k_B,k_M)}$ of (19) the signal received at the receive antenna $k_M$ of MT $\mu k$ can be expressed as a vector $$\underline{r}_0^{(k,k_M)} = \sum_{k_B=1}^{K_B} \underline{H}_0^{(k,k_B,k_M)} \underline{t}_0^{(k,k_B)} \tag{20}$$

$$= \underbrace{(\underline{H}_0^{(k,1,k_M)} \ldots \underline{H}_0^{(k,K_B,k_M)})}_{\underline{H}_0^{(k,k_M)}} \underline{t}_0^{(k)}, k_M = 1 \ldots K_M,$$

of dimension $S_0+W-1$. $H_0^{(k,k_M)}$ in (20) has the dimension $(S0+W-1) \times (K_B S_0)$. $\underline{r}_0^{(k,k_M)}$ of (20) is an MT- and receive antenna-specific signal. With $\underline{r}_0^{(k,k_M)}$ the overall signal received at MT $\mu_k$ is received as $$\underline{r}_0^{(k)} = \left(\underline{r}_0^{(k,1)T} \ldots \underline{r}_0^{(k,K_M)T}\right)^T \tag{21}$$

$$= \underbrace{\left(\underline{H}_0^{(k,1)T} \ldots \underline{H}_0^{(k,K_M)T}\right)^T}_{\underline{H}_0^{(k)}} \underline{t}_0^{(k)}$$

$$= \underline{H}_0^{(k)} \underline{t}_0^{(k)}$$

Figure 2:
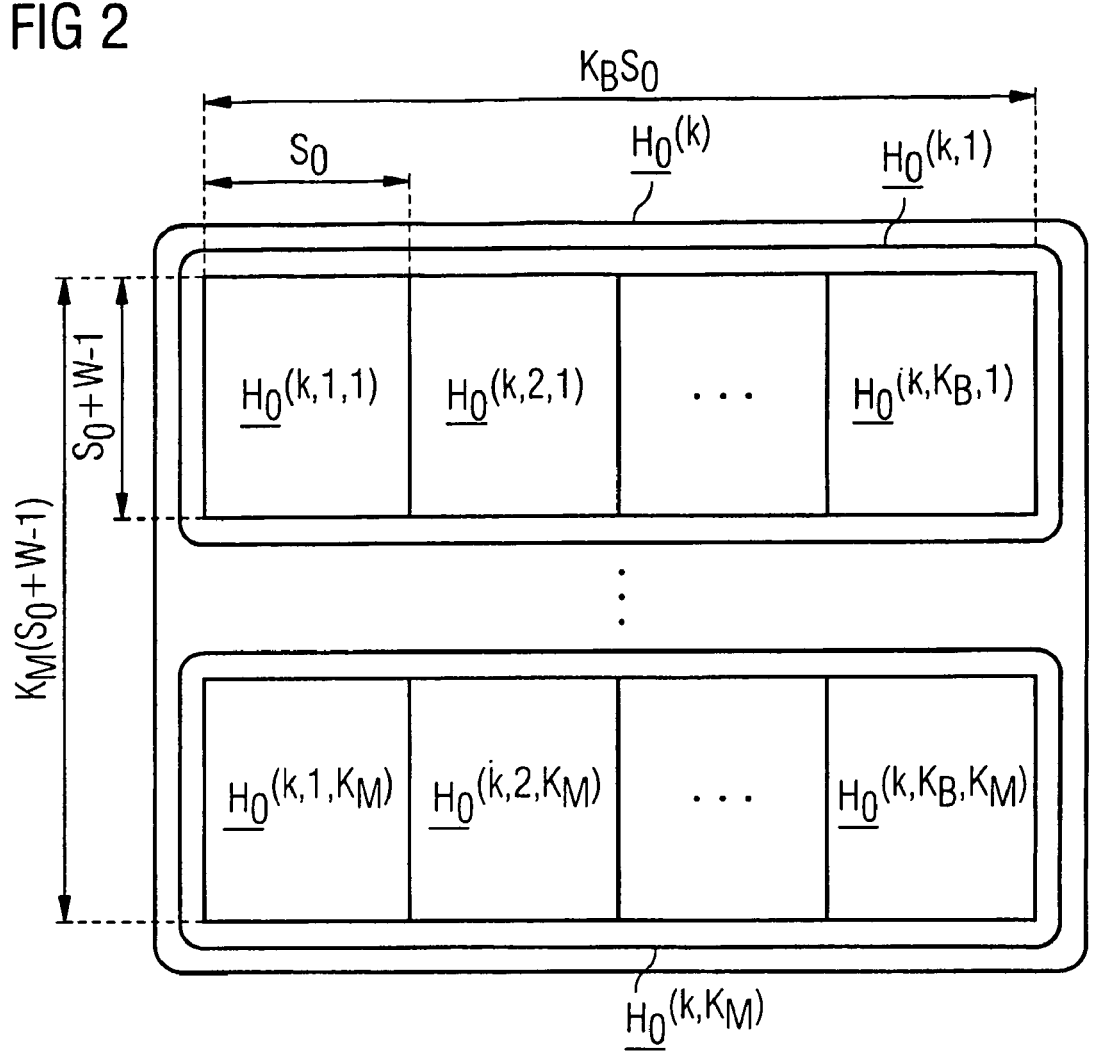
FIG. 2 shows the structure of a channel matrix $\underline{H}_0^{(k)}$ in accordance with equation (21) below.

$\underline{r}_0^{(k)}$ and $H_0^{(k)}$ from (21) have the dimensions $K_M(S_0+W-1)$ or $[_{KM}(S_0+W-1) \times (K_B S_0)$. FIG. 2 shows the structure of the matrix $H_0^{(k)}$.

With $\underline{t}_0^{(k)}$ from (2) and $\underline{r}_0^{(k)}$ from (21), the energies transmitted by the AP and received by MT $\mu_k$ become $$T_0^{(k)} = \underline{t}_0^{(k)*T} \underline{t}_0^{(k)} \text{ or} \tag{22}$$

$$R_0^{(k)} = \underline{r}_0^{(k)*T} \underline{r}_0^{(k)} \tag{23}$$

$$= \underline{t}_0^{(k)*T} \underline{H}_0^{(k)*T} \underline{H}_0^{(k)} \underline{t}_0^{(k)}.$$

One would also require that the ratio $R_0^{(k)}/T_0^{(k)}$ f $R_0^{(k)}$ from (23) and $T_0^{(k)}$ from (22) is to be maximized by the correct choice of $\underline{t}_0^{(k)}$ from (17). To achieve this maximization, $\underline{t}_0^{(k)}$ from (17) should be selected as follows:

$$\underline{t}_0^{(k)} = \underset{\underline{t}_0^{(k)}}{\operatorname{argmax}} \left( \frac{\underline{t}_0^{(k)*T} \underline{H}_0^{(k)*T} \underline{H}_0^{(k)} \underline{t}_0^{(k)}}{\underline{t}_0^{(k)*T} \underline{t}_0^{(k)}} \right), \tag{24}$$

which corresponds to a Rayleigh quotient. With $H_0^{(k)}$ from (21) the transmit signal $\underline{t}_0^{(k)}$ determined by (24) is the inherent vector $\underline{u}_0^{(k)}$ of the matrix $\underline{H}_0^{(k)r}$ with $\underline{H}_0^{(k)}$ belonging to the largest inherent value of this matrix, meaning $$\underline{t}_0^{(k)} = \underline{u}_0^{(k)}. \tag{25}$$

By substitution of $\underline{t}_0^{(k)}$ from (25) in (21) the overall receive signal $$\underline{r}_0^{(k)} = \underline{H}_0^{(k)} \underline{u}_0^{(k)}. \tag{26}$$

is produced.

The best demodulator for this signal is a filter adapted to the signal, which with $\underline{r}_0^{(k)}$ from (21), leads to the demodulator matrix $$\begin{aligned}\underline{D}_0^{(k)} &= \underline{r}_0^{(k)*T} \\ &= \underline{u}_0^{(k)*T} \underline{H}_0^{(k)*T} \\ &= \left(\underline{D}_0^{(k,1)} \ldots \underline{D}_0^{(k,K_M)}\right) \\ &= \left(\underline{D}_{0,1}^{(k)} \ldots \underline{D}_{0,K_M(S_0+W-1)}^{(k)}\right)\end{aligned} \tag{27}$$

$$\tag{28}$$

of dimension $1 \times [K_M(S_0+W-1)]$, where the receive antenna-specific demodulator matrices $$\underline{D}_o^{(k,k_M)} = \underline{r}_0^{(k,k_M)*T}, k_M = 1 \ldots K_M, \tag{29}$$

have the dimension $1 \times (S_0+W-1)$.

Multiple MT-JT System with a Number of Symbols with One MIMO Antenna Arrangement a) Transmission Model If we now look at the more realistic situation in which the AP communicates simultaneously with all K MT $\mu_k$ (k=1 ... K) and where, instead of only one data symbol per MT, N>1 data symbols are transmitted, with each of these data symbols being spectrally spread by the factor $S_0$ already introduced in Section 2.

TABLE 1

Names and dimensions of vectors introduced in Section 2.

| Vector | Name | Dimension |
|---|---|---|
| $\underline{t}_0^{(k,k_B)}$ | MT- and transmit antenna-Specific transmit signal | $S_0$ |
| $\underline{t}_0^{(k)}$ | MT-specific transmit signal | $K_B S_0$ |
| $\underline{h}^{(k,k_B,k_M)}$ | MT- and antenna-specific Channel response word | W |
| $\underline{r}_0^{(k,k_B)}$ | MT- and receive antenna-Specific receive signal | $S_0 + W - 1$ |
| $\underline{r}_0^{(k)}$ | MT-specific Receive signal | $K_M(S + W - 1)$ |
| $\underline{u}_0^{(k)}$ | Inherent vector of $\underline{H}^{(k)*\tau} \underline{H}^{(k)}$ belonging to the largest inherent value | $K_B S_0$ |

TABLE 2

Names and dimensions of matrices introduced in Section 2.

| Matrix | Name | Dimension |
|---|---|---|
| $\underline{H}_0^{k,k_B,k_M}$ | MT- and antenna-specific channel matrix | $(S_0 + W - 1) \times S_0$ |

TABLE 2-continued

Names and dimensions of matrices introduced in Section 2.

| Matrix | Name | Dimension |
|---|---|---|
| $\underline{H}_0^{k,k_M}$ | MT- and receive antenna-specific channel matrix | $(S_0 + W - 1) \times (K_B S_0)$ |
| $\underline{H}_0^{(k)}$ | MT-specific channel matrix | $[K_M(S_0 + W - 1)] \times (K_B S_0)$ |
| $\underline{D}_0^{(k)}$ | MT-specific demodulator matrix | $1 \times [K_M(S_0 + W - 1)]$ |
| $\underline{D}_0^{k,k_M}$ | MT- and receive antenna specific demodulator matrix | $1 \times (S_0 + W - 1)$ |

As before, the AP is equipped with KB transmit antennas and each MT $\mu_k$ features $K_M$ receive antennas. Below, the signal descriptions introduced in Section 2 are first adapted to this new situation. Then, on the basis of the demodulator matrices $\underline{D}_0^{(k)}$ from (27) a demodulator matrix $\underline{D}$ is created. The names and dimensions of the vectors and matrices introduced in the course of Section 3 are summarized in Tables 3 or 4.

Instead of $\underline{t}_0^{(k,k_B)}$ from (16) there is the transmit antenna-specific transmit signal $$\underline{t}^{(k_B)} = \left(\underline{t}_1^{(k_B)} \ldots \underline{t}_S^{(k_B)}\right)^T, k_B = 1 \ldots K_B, \tag{30}$$

of the dimension $$S = NS_0, \tag{31}$$

and instead of $\underline{t}_0^{(k)}$ from (17) the overall transmit signal $$\underline{t} = \left(\underline{t}^{(1)T} \ldots \underline{t}^{(K_B)T}\right)^T \tag{32}$$

of the dimension $K_B S$ is produced.

Instead of $\underline{H}_0^{k,k_B,k_M}$ from (19) the MT- and antenna-specific channel matrix $$\underline{H}^{(k,k_B,k_M)} = \left(\underline{H}_{i,j}^{(k,k_B,k_M)}\right), i = 1 \ldots S + W - 1, j = 1 \ldots S, \tag{33}$$

$$\underline{H}_{i,j}^{(k,k_B,k_M)} = \begin{cases} h_{i-j+1}^{(k,k_B,k_M)} & 1 \le i - j + 1 \le W, \\ 0 & \text{sonst}, \end{cases}$$

$$k_M = 1 \ldots K_M, k = 1 \ldots K, k_B = 1 \ldots K_B.$$

is produced.

$\underline{H}_0^{k,k_B,k_M}$ from (33) has the dimension $(S+W-1) \times S$.

Instead of $\underline{r}_0^{(k,k_B)}$ from (20), $\underline{t}$ from (32) and $\underline{H}_0^{k,k_B,k_M}$ from (33) produce the MT- and receive antenna-specific receive signal $$\underline{r}^{(k,k_M)} = \sum_{k_B=1}^{K_B} \underline{H}^{(k,k_B,k_M)} \underline{t}^{(k_B)} \tag{34}$$

-continued $$= \underbrace{(\underline{H}^{(k,1,k_M)} \ldots \underline{H}^{(k,K_B,k_M)})}_{\underline{H}^{(k,k_M)}} \underline{t}.$$

$\underline{r}^{k,k_B}$ and $\underline{H}^{k,k_M}$ from (34) have the dimensions (S+W−1) or (S+W−1)×($K_B$S).

With $\underline{H}^{k,k_M}$ from (34) and $\underline{t}$ from (32) the overall signal received by MT μk can be written as follows:

$$\underline{r}^{(k)} = \left( \underline{r}^{(k,1)T} \ldots \underline{r}^{(k,K_M)T} \right)^T \quad (35)$$

$$= \underbrace{(\underline{H}^{(k,1)T} \ldots \underline{H}^{(k,k_M)T})}_{\underline{H}^{(k)}} \underline{t}$$

$$= \underline{H}^{(k)} \underline{t}$$

$\underline{r}^{(k)}$ and $\underline{H}^{(k)}$ from (35) have the dimensions $K_M(S+W-1)$ or $[K_M(S+W-1)] \times K_B S$. As an extension of the observations in the previous section, an overall receive signal $$\underline{r} = \left( \underline{r}^{(1)T} \ldots \underline{r}^{(K)T} \right)^T \quad (36)$$

$$= \left( \underline{H}^{(1)T} \ldots \underline{H}^{(K)T} \right)^T \underline{t}$$

$$= \underline{H} \underline{t}$$

is now introduced with the K receive signals $\underline{r}^{(k)}$ from (34) of all K MT $\mu_k$ (k=1 ... K). $\underline{r}$ and $\underline{H}$ from (35) have the dimensions $KK_M(S+W-1)$ or $[KK_M(S+W-1)] \times K_B S$.

b) Determining the Demodulator Matrix $\underline{D}$

According to the observations made in [2], for each of the K MT $\mu_k$ (k=1 ... K) a demodulator matrix $\underline{D}^{(k)}$ of dimension $N \times [K_M(S+W-1)]$ must be determined and then the overall demodulator matrix of the dimension $(KN) \times [KK_M(S+W-1)]$ is produced as $$\underline{D} = \text{diagonal block matrix } (\underline{D}^{(1)} \ldots \underline{D}^{(k)}) \quad (37)$$

TABLE 3

Names and dimensions of vectors introduced in this section

| Vector | Name | Dimension |
|---|---|---|
| $\underline{t}^{k_a)}$ | transmit antenna-specific transmit signal | S = $NS_0$ |
| $\underline{t}$ | Overall transmit signal | KBS |
| $\underline{r}^{k,k_a}$ | MT- and receive antenna specific receive signal | S + W − 1 |
| $\underline{r}^{(k)}$ | MT-specific receive signal | $K_M$(S + W − 1) |
| $\underline{r}$ | Overall receive signal | $KK_M$(S + W − 1) |
| $\underline{d}$ | Overall data vector | KN |

TABLE 4

Names and dimensions of matrices introduced in this section.

| Matrix | Designation | Dimension |
|---|---|---|
| $\underline{H}^{k,k_a,k_M) H}$ | MT- and antenna-specific channel matrix | (S + W − 1) × S |
| $\underline{H}_0^{k,k_M}$ | MT- and receive antenna-specific channel matrix | (S + W − 1) × ($K_B$S) |

TABLE 4-continued

Names and dimensions of matrices introduced in this section.

| Matrix | Designation | Dimension |
|---|---|---|
| $\underline{H}^{(k)}$ | MT-specific channel matrix | [Km (S + W − 1)] × ($K_B$S) |
| $\underline{H}$ | Overall channel matrix | [$KK_M$(S + W − 1)] × ($K_B$S) |
| $\underline{D}^{(k)}$ | MT-specific demodulator matrix | N × [$K_M$(S + W − 1)] |
| $\underline{D}$ | Overall demodulator matrix | (KN) × [$KK_M$(S + W − 1)] |
| $\underline{B}$ | System matrix | (KN) × ($K_B$S) |
| $\underline{M}$ | Modulator matrix | ($K_B$S) × (KN) |

The decisive point of the proposal for constructing the demodulator matrix $\underline{D}^{(k)}$ taking into consideration the channel characteristics lies in the demodulator matrix $\underline{D}_0^{(k)}$ introduced in (27). The N lines of $\underline{D}^{(k)}$ are obtained as shifted versions of $\underline{D}_0^{(k)}$ from (27) in accordance with the method $$\underline{D}_{i,j}^{(k)} = (D_{i,j}^{(k)}), i = 1 \ldots N, j = 1 \ldots [K_M(S_0 N + W - 1)], \quad (38)$$

$$D_{i,j}^{(k)} =$$

$$\begin{cases} D_{0,p}^{(k)} & 1 \le (j - (i-1)S_0) \bmod (S_0 N + W - 1) \le S_0 + W - 1, \\ 0 & \text{sonst,} \end{cases}$$

with $$p = (j - (i-1)S_0) \bmod (S_0 N + W - 1) + (S_0 + W - 1) \cdot \left[ \frac{j}{S_0 N + W - 1} \right], \quad (39)$$

and [ ] designating the integer part. The structure of $\underline{D}^{(k)}$ from (38) is shown in FIG. 3.

$\underline{D}$ from (37) can be formed with the K matrices $\underline{D}^{(k)}$ from (38). With $\underline{D}$ from (37) and $\underline{H}$ from (36) the system matrix $$\underline{B} = \underline{D}\underline{H} \quad (40)$$

of the dimension $KN \times K_B S$ is obtained. As shown in [2], the overall transmit signal $\underline{t}$ from (22) and the overall data vector $\underline{d}$ [2] of the dimension KN can be obtained as $$\underline{t} = \underbrace{\underline{B}^{*T}(\underline{B}\underline{B}^{*T})^{-1}}_{\underline{M}} \underline{d} \quad (41)$$

$$= \underline{M}\underline{d}$$

with the modulator matrix $\underline{M}$ from (41) possessing the dimension $(K_B S) \times (KN)$.

Although the present invention has been described with reference to specific embodiments, those of skill in the art will recognize that changes may be made thereto without departing from the spirit and scope of the present invention as set forth in the hereafter appended claims.

The invention claimed is:

1. A method of transmitting information in a radio communication system, the method comprising:

connecting a transmit station to at least two receiver stations via a radio communication interface;

including a transmit antenna with at least two antenna elements at the transmit station and including a transmit antenna with at least two antenna elements at each of the receiver stations, wherein the transmit station and the receiver stations communicate using MIMO transmission;

generating transmit signals for radiation from the antenna elements of the transmit antenna of the transmit station in a common process and matching the transmit signals with regards to a transmit energy to be used for radiation;

detecting received signals received by antenna elements of receive antennas of the receiver stations in a linear signal processing through demodulation, taking into account space and time transmission characteristics between the transmit station and the respective receiver stations, wherein a receiver station specific transmit signal corresponds to a Rayleigh quotient;

calculating individual transmit signals for the antenna elements of the transmit antenna of the transmit station before radiation using a modulator matrix;

generating a transmit signal vector using a linear modulation of a data vector to be transmitted with the modulator matrix;

processing the received signals, the processing including using a demodulation matrix for linear receive-side signal processing;

connecting the transmit station to the receiver stations using at least one radio channel having a channel matrix; and including a system matrix in the modulator matrix specified by a product of the demodulator matrix and the channel matrix.

2. A radio communication system for transmitting information, comprising:

at least one transmit station including a transmit antenna with at least two antenna elements;

at least two receiver stations each including a transmit antenna with at least two antenna elements; and a radio communication interface for connecting the at least one transmit station and the at least two receiver stations;

wherein the transmit station generates transmit signals which are radiated by the antenna elements of the transmit antenna of the transmit station in a common process and matches the transmit signals with regards to a transmit energy to be employed for radiation;

wherein each of the receiver stations detect receive signals received by antenna elements of receive antennas of the receiver stations in a linear signal processing through demodulation, taking into account space and time transmission characteristics between the transmit station and the respective receiver stations;

wherein a receiver station specific transmit signal corresponds to a Rayleigh quotient;

wherein individual transmit signals are calculated for the antenna elements of the transmit antenna of the transmit station before radiation using a modulator matrix;

wherein a transmit signal vector is generated using a linear modulation of a data vector to be transmitted with the modulator matrix;

wherein the received signals are processed using a demodulation matrix for linear receive-side signal processing;

wherein the transmit station and the receiver stations are connected using at least one radio channel having a channel matrix; and wherein a system matrix is included in the modulator matrix as specified by a product of the demodulator matrix and the channel matrix.

* * * * *